(12) United States Patent
Ataka

(10) Patent No.: US 11,487,489 B2
(45) Date of Patent: Nov. 1, 2022

(54) PRINT INSTRUCTION DEVICE AND PRINT CONTROL METHOD

(71) Applicant: SHARP KABUSHIKI KAISHA, Sakai (JP)

(72) Inventor: Hiroyuki Ataka, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 17/573,535

(22) Filed: Jan. 11, 2022

(65) Prior Publication Data

US 2022/0236935 A1    Jul. 28, 2022

(30) Foreign Application Priority Data

Jan. 22, 2021 (JP) .............................. JP2021-008854

(51) Int. Cl.
*G06F 3/12* (2006.01)

(52) U.S. Cl.
CPC .......... *G06F 3/1291* (2013.01); *G06F 3/1203* (2013.01); *G06F 3/1273* (2013.01)

(58) Field of Classification Search
CPC ..... G06F 3/1203; G06F 3/1291; G06F 3/1273
See application file for complete search history.

(56) References Cited

U.S. PATENT DOCUMENTS

| | | | |
|---|---|---|---|
| 10,095,454 B1 * | 10/2018 | Kamada | G06F 3/1288 |
| 2011/0107117 A1 * | 5/2011 | Jung | G06F 1/3287 |
| | | | 710/16 |
| 2015/0193175 A1 * | 7/2015 | Mori | G06F 3/1258 |
| | | | 358/1.15 |
| 2016/0054961 A1 * | 2/2016 | Asthana | G06F 3/1236 |
| | | | 358/1.15 |
| 2019/0306331 A1 * | 10/2019 | Oguchi | H04N 1/00225 |

FOREIGN PATENT DOCUMENTS

| | | |
|---|---|---|
| JP | 2011-186897 A | 9/2011 |
| JP | 2018-190146 A | 11/2018 |

* cited by examiner

*Primary Examiner* — Iriana Cruz
(74) *Attorney, Agent, or Firm* — ScienBiziP, P.C.

(57) ABSTRACT

A print instruction device includes: a communicator that communicates with plural printers, each of which has a function as a parent machine storing print data and a function as a child machine acquiring and printing the print data; a print data sending processor that sends the print data to be stored in the parent machine; a print completion reception processor that receives print completion information from the child machine; a print history manager that updates print-related history on the basis of the received print completion information; and a parent machine setting device that specifies a most frequently used printer on the basis of the updated history when sending the print data, switches the parent machine to a specified printer, and causes the switched parent machine to send the print data.

7 Claims, 15 Drawing Sheets

320

| | PARENT MACHINE SETTINGS | CHILD DEVICE USAGE COUNTER | IP ADDRESS | CHILD DEVICE ATTRIBUTE |
|---|---|---|---|---|
| MULTIFUNCTION PERIPHERAL 100 | Yes | 0 | xxx.xxx.xxx.xxx | ID:0001<br>COLOR PRINTABLE: NO<br>STAPLEABLE: NO |
| MULTIFUNCTION PERIPHERAL 200 | No | 10 | yyy.yyy.yyy.yyy | ID:0002<br>COLOR PRINTABLE: YES<br>STAPLEABLE: NO |
| MULTIFUNCTION PERIPHERAL 201 | No | 4 | zzz.zzz.zzz.zzz | ID:0003<br>COLOR PRINTABLE: YES<br>STAPLEABLE: YES |

FIG. 10

| | PARENT MACHINE SETTINGS | CHILD DEVICE USAGE COUNTER | IP ADDRESS | CHILD DEVICE ATTRIBUTE |
|---|---|---|---|---|
| MULTIFUNCTION PERIPHERAL 100 | Yes | 0 | xxx.xxx.xxx.xxx | ID:0001 COLOR PRINTABLE: NO STAPLEABLE: NO |
| MULTIFUNCTION PERIPHERAL 200 | No | 10 | yyy.yyy.yyy.yyy | ID:0002 COLOR PRINTABLE: YES STAPLEABLE: NO |
| MULTIFUNCTION PERIPHERAL 201 | No | 4 | zzz.zzz.zzz.zzz | ID:0003 COLOR PRINTABLE: YES STAPLEABLE: YES |

320

PRINT INSTRUCTION DEVICE AND PRINT CONTROL METHOD

BACKGROUND OF THE INVENTION

Field of the Invention

The present invention relates to a print instruction device and a print control method, in detail, a print instruction device and a print control method that send print data to a printer having a function as a parent machine and cause the printer to store the print data so as to allow a printer having a function as a child machine to acquire and print the print data stored in the parent machine.

Description of the Background Art

A print system that does not require a dedicated print server by operating any of plural printers as a print server in an environment where the plural printers are communicably connected has been known. The print system that does not require the dedicated print server by operating any of the printers, which are communicably connected as described above, as the print server (a parent machine) will also be referred to as a print release function in the present specification.

An example of a print flow using the print release function is as follows. Any one of the plural printers is set as the parent machine in advance. A user creates data to be printed on an information device. When printing is performed using the print release function, the information device sends the created print data to the parent machine. The parent machine receives the print data that is sent from the information device, and stores the print data in memory. As it has been described so far, after the print data is saved in the printer, which is set as the parent machine, the user goes to a printer (a child machine) that can output the print data stored in the parent machine. Then, the user selects the print data to be printed by using an operation device in the child machine, and instructs to perform printing.

The child machine accesses the parent machine, acquires the print data stored in the memory of the parent machine, and performs printing. In the case where the child machine is the same printer as the parent machine, the print data that is stored in the memory of the own machine is printed. As it has been described so far, the print data is stored in the parent machine. In this way, printing can be output from any of the plural printers that are communicably connected.

The user may decide which one of the printers is used as the parent machine. For example, the user may specify the parent machine on an operation screen of the printer driver in a print instruction device (an information processor) that accepts a print instruction from the user. Such an aspect has been known in which a device specification field is arranged on the operation screen of the printer driver and, in the device specification field, a "use-target printer" (a document storage device or the parent machine) as a sending destination device of document data to be printed (the print data) is specified (for example, see Japanese Patent Application Publication No. 2018-190146).

Alternatively, such a system has been known that the parent machine (a master machine) is determined and decided on the basis of a predetermined reference through communication among image forming apparatuses connected to a network without the parent machine setting by the user. The predetermined reference is that device information shared among those image forming apparatuses is the latest, that a machine specification is the highest, or the like. The thus-decided master machine accepts registration of a member machine (the child machine) that is managed by the master machine, and creates and manages a member list. In addition, the master machine acquires device information from the member machine and manages the acquired device information (for example, see Japanese Patent Application Publication No. 2011-186897).

In the case where the image forming apparatus that outputs printing in the print release function is the parent machine that stores the print data, there is no processing to exchange the print data via communication. Accordingly, it is possible not only to avoid a load on the network but also to reduce a time required to transfer the print data. The child machine acquires information from the parent machine at the time of displaying the print data, which is stored in the memory, in an operation device of the parent machine in order to accept selection of the print data to be output by the user. In the case where the image forming apparatus that outputs printing is the parent machine, it is possible not only to avoid the load on the network but also to reduce the time required for data transfer.

The present invention has been made in consideration of a circumstance as described above, changes a setting such that the most frequently used printer is set as a parent machine, and reduces a load related to transfer of print data in a print system that corresponds to a print release function to operate any of plural printers as a parent machine.

SUMMARY OF THE INVENTION

The present invention provides a print instruction device that includes: a communicator that communicates with plural printers, each of which has a function as a parent machine storing print data and has a function as a child machine acquiring and printing the print data; a print data sending processor that sends the print data to be stored in the parent machine; a print completion reception processor that receives print completion information from the child machine that has printed the print data; a print history manager that updates print-related history of a corresponding printer on the basis of the received print completion information; and a parent machine setting device that specifies a most frequently used printer on the basis of the updated history when sending new print data, switches the parent machine to a specified printer when the specified printer differs from the current parent machine, and causes the switched parent machine to send the new print data.

In addition, from a different perspective, the present invention provides a print control method that includes: sending print data to be stored in a parent machine by a controller of a print instruction device that communicates with plural printers, each of which has a function as the parent machine storing the print data and has a function as a child machine acquiring and printing the print data; receiving print completion information from the child machine that has printed the print data; updating print-related history of a corresponding printer on the basis of the received print completion information; and specifying a most frequently used printer on the basis of the updated history when sending new print data, switching the parent machine to a specified printer when the specified printer differs from the current parent machine, and sending the new print data to the switched parent machine.

The printer according to the present invention includes the parent machine setting device that specifies the most frequently used printer on the basis of the updated history when sending the new print data, and switches the parent machine to the specified printer when the specified printer differs from the current parent machine. In a print system in which any of the plural printers is operated as the parent machine, a setting can be changed such that the most frequently used printer for printing is set as the parent machine. In this way, it is possible to reduce a load of print data transfer.

The control method for the printer according to the present invention also exerts similar operational effects.

BRIEF DESCRIPTION OF THE DRAWINGS

FIG. 10 is an explanatory view illustrating an example of a print management table in this embodiment.

DESCRIPTION OF THE PREFERRED EMBODIMENTS

A further detailed description will hereinafter be made on the present invention with reference to the drawings. The following description is illustrative in all respects and should not be construed as limiting the present invention.

First Embodiment

Configurations of Print System and Image Forming Apparatus

Figure 1:
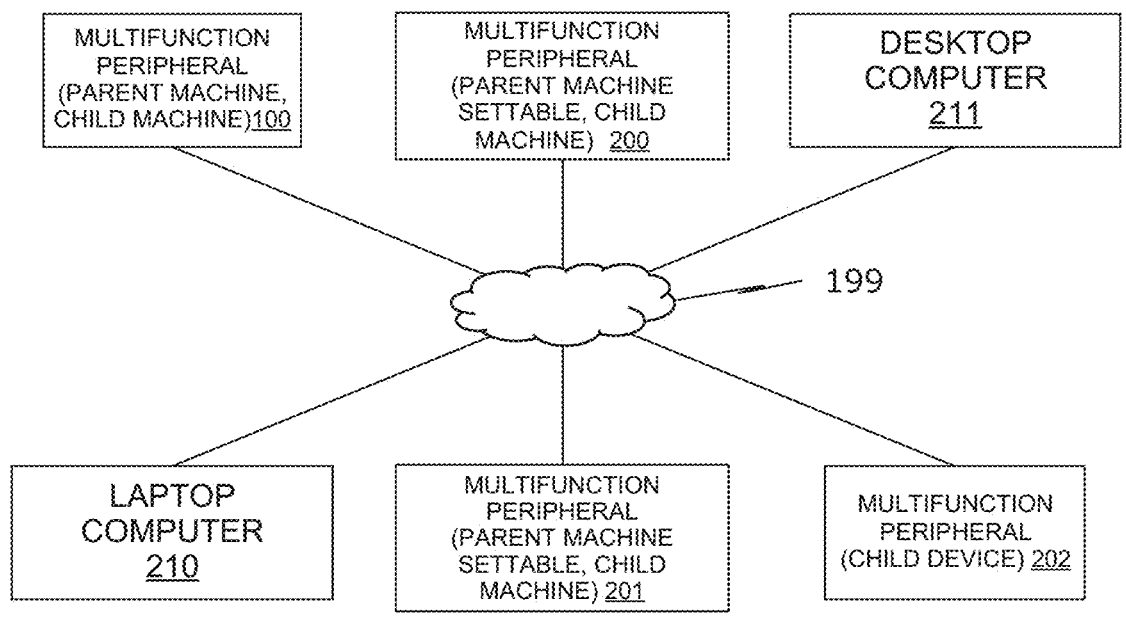
FIG. 1 is a block diagram illustrating a configuration example of an image forming system according to this embodiment.

FIG. 1 is a block diagram illustrating a configuration example of an image forming system according to this embodiment. As illustrated in FIG. 1, in the imaging system, multifunction peripherals 100, 200, 201, 202, each of which corresponds to a print release function, a laptop computer 210, and a desktop computer 211 are connected to a network 199. The multifunction peripheral 100 functions as a parent machine and a child machine related to the print release function. The multifunction peripherals 200, 201, 202 each function as a child machine related to the print release function. Of those, each of the multifunction peripherals 200, 201 can also function as a parent machine but is not currently set as the parent machine. Meanwhile, the multifunction peripheral 202 only functions as the child machine and cannot function as a parent machine.

The laptop computer 210 and the desktop computer 211 each creates a content (print data) to be printed by any of the multifunction peripherals 100, 200, 201, 202. When printing the content (the print data) by using the print release function, the laptop computer 210 and the desktop computer 211 each send the created print data to the multifunction peripheral 100 as the parent machine.

For example, when plural image forming apparatuses are connected to the single network 199, a service engineer who performs installation or an administrator who manages the network selects one of the plural image forming apparatuses and initially sets the selected one as the parent machine. The same applies to setting of the child machine. Here, in the case where the multifunction peripheral that is connected to the network 199 corresponds to the print release function, such a multifunction peripheral can at least function as the child machine. However, in the case where there is the multifunction peripheral that is not desired to function as the child machine, it may be possible not to set such a multifunction peripheral as the child machine. In this embodiment, the laptop computer 210 and the desktop computer 211, each of which functions as a print instruction device, can each switch the parent machine setting to another multifunction peripheral.

Figure 2:
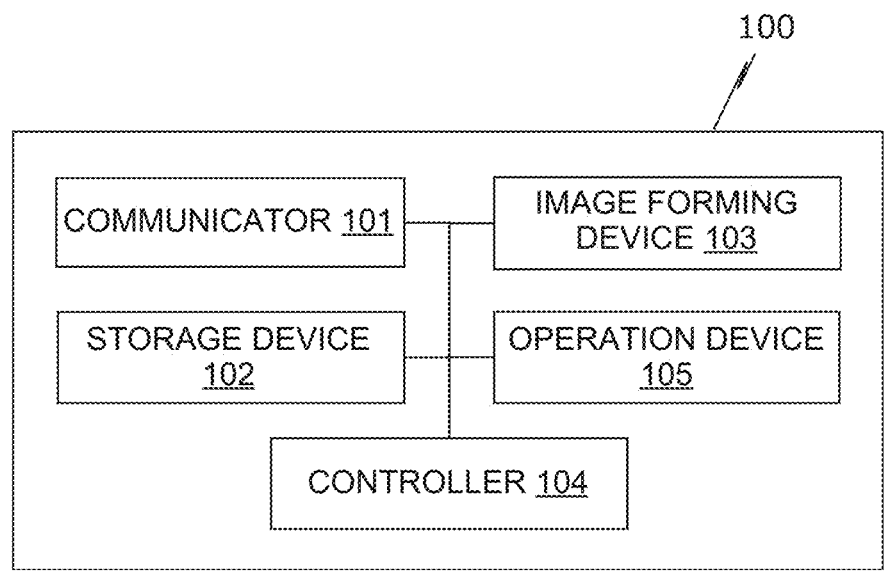
FIG. 2 is a block diagram illustrating a configuration of a multifunction peripheral 100 illustrated in FIG. 1.

FIG. 2 is a block diagram illustrating a configuration of the multifunction peripheral 100, which is illustrated in FIG. 1, as a representative example of the image forming apparatus in this embodiment. The other multifunction peripherals 200, 201, 202 in this embodiment each have a similar configuration. However, the multifunction peripheral 202 does not have a configuration to function as the parent machine.

As illustrated in FIG. 2, the multifunction peripheral 100 includes a communicator 101, a storage device 102, an image forming device 103, a controller 104, and an operation device 105.

The communicator 101 is a network interface circuit and is a circuit used to communicate with an external device that is connected via the network 199. The communication may be performed in a wired or wireless manner, and any communication method can be adopted.

The storage device 102 is a non-volatile storage and stores a program that is executed by a processor in the controller 104, which will be described below. The storage device 102 further stores the print data that is printed by the image forming device 103 at the time when the multifunction peripheral 100 functions as the child machine or a normal printer that does not use the print release function. At the time, the storage device 102 stores the print data that is received from the laptop computer 210 or the desktop computer 211. Furthermore, the storage device 102 stores the print data as a print server when the multifunction peripheral 100 functions as the parent machine. Specific hardware examples of the storage device 102 are flash memory and a hard disk device.

The image forming device 103 prints the print data that is stored in the storage device 102. Although a printing method is not limited, an example of the printing method is an electrophotographic method.

The controller 104 is a circuit that includes peripheral circuits, such as an input/output circuit and a timer circuit, and the processor as a central component. The controller 104 controls operation of the devices in the multifunction peripheral 100.

Figure 3:
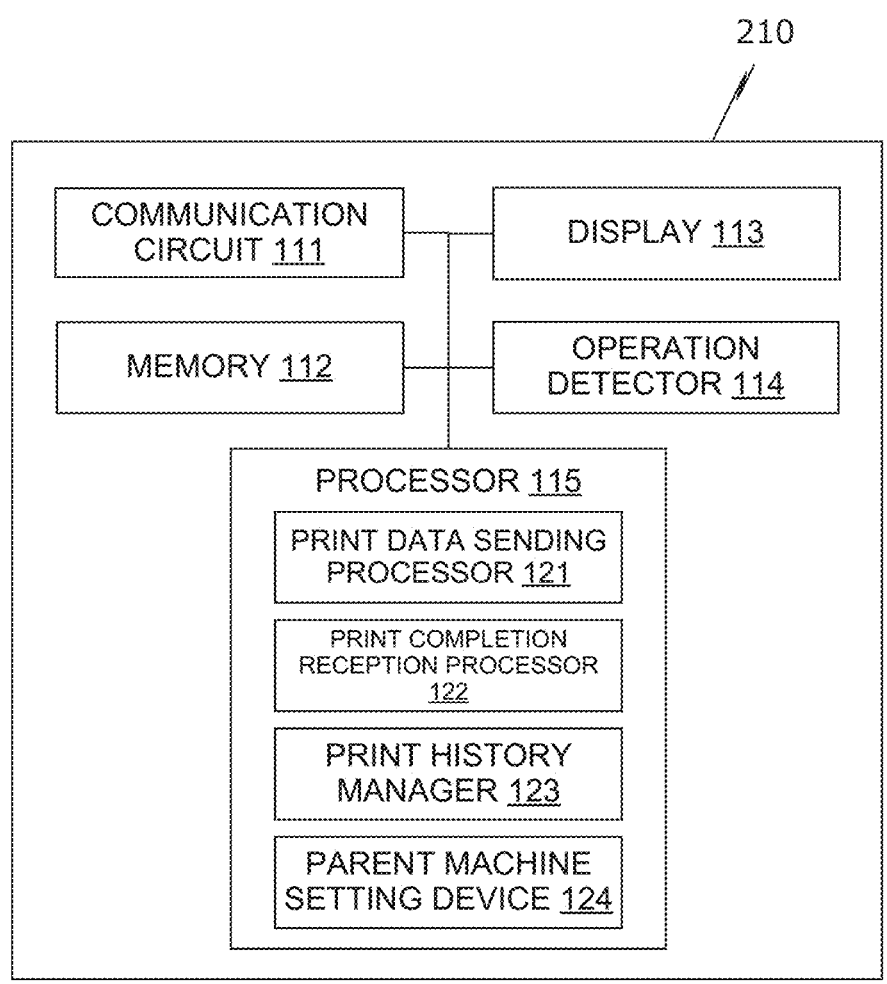
FIG. 3 is a block diagram illustrating a configuration of a print instruction device in this embodiment.

FIG. 3 is a block diagram illustrating a configuration of the laptop computer 210 as a representative example of the print instruction device in this embodiment. The desktop computer 211 has a similar configuration.

As illustrated in FIG. 3, the laptop computer 210 includes a communication circuit 111, memory 112, a display 113, an operation detector 114, and a processor 115.

The communication circuit 111 is a network interface circuit and is a circuit used to communicate with the external device that is connected via the network 199. The communication may be performed in the wired or wireless manner, and any communication method can be adopted.

The memory 112 stores a program, which is executed by the processor, and data. Furthermore, the memory 112 generates and stores the print data to be printed by any of the multifunction peripherals 100, 200, 201, 202. Alternatively, the memory 112 acquires the print data from a device such as an external server, and stores the print data. Furthermore, the memory 112 stores data on print-related history that is managed for each of the multifunction peripherals that performs printing using the print release function. A specific example of hardware that constitutes the memory 112 is a combination of DRAM and a hard disk device or a solid state drive (SSD).

The display 113 is a display device using liquid-crystals or an organic light-emitting diode (OLED).

The operation detector 114 is a circuit that accepts an instruction from a user. Examples of the operation detector 114 are an operation switch and a touch panel that is arranged on a surface of the display device.

Each of the display 113 and the operation detector 114 is the hardware that is associated with a user interface.

The processor 115 includes a print data sending processor 121, a print completion reception processor 122, a print history manager 123, and a parent machine setting device 124.

The print data sending processor 121 executes processing to generate the print data, which is stored in the parent machine with the print release function, or acquire the print data and send the print data. In other words, of processing that is executed by the processor 115, the print data sending processor 121 is related to processing as a print driver that generates and sends the print data. Of the processing as the print driver that is executed by the processor 115, the print completion reception processor 122 receives print completion information from the child machine, which has performed printing using the print release function, and executes processing associated therewith. Of the processing as the print driver that is executed by the processor 115, the print history manager 123 updates the print-related history that is managed for the printer as a sending source of the print completion information on the basis of the received print completion information. Of the processing as the print driver that is executed by the processor 115, the parent machine setting device 124 refers to the print-related history for each of the printers, and updates the parent machine setting related to the print release function on the basis of the history when necessary.

As it has been described so far, in the print system, which is illustrated in FIG. 1, and in which the plural image forming apparatuses are communicably connected via the network 199, the user can perform normal printing, and can also perform printing using the print release function.

First, a brief description will be made on normal printing. It is assumed that the user has created data to be printed on the laptop computer 210, for example. In such a case, the user sends the data to be printed to any of the multifunction peripherals 100, 200, 201, 202 that are connected via the network 199. The multifunction peripheral as a sending destination performs printing on the basis of the sent print data. The description so far has been made on normal printing.

Next, a description will be made on printing using the print release function. In the print system illustrated in FIG. 1, one of the multifunction peripherals is set as the parent machine. Printing is performed by using such a parent machine as the print server. Although a dedicated PC server is not prepared, the parent machine functions as the print server and stores the print data in the storage device 102. Any of the multifunction peripherals 100, 200, 201, 202 functioning as the child machine acquires the print data, which is stored in the storage device 102 of the parent machine, and performs printing. In the case where the multifunction peripheral 100 functions as the child machine, the multifunction peripheral 100 performs printing by using the print data that is stored in the storage device 102 of the own machine. In the case where any of the multifunction peripherals 200, 201, 202 functions as the child machine, any of the multifunction peripherals 200, 201, 202 acquires the print data, which is stored in the storage device 102 of the parent machine 100, and then performs printing via communication.

Operation Procedure for Printing Using Print Release Function

Figure 4:
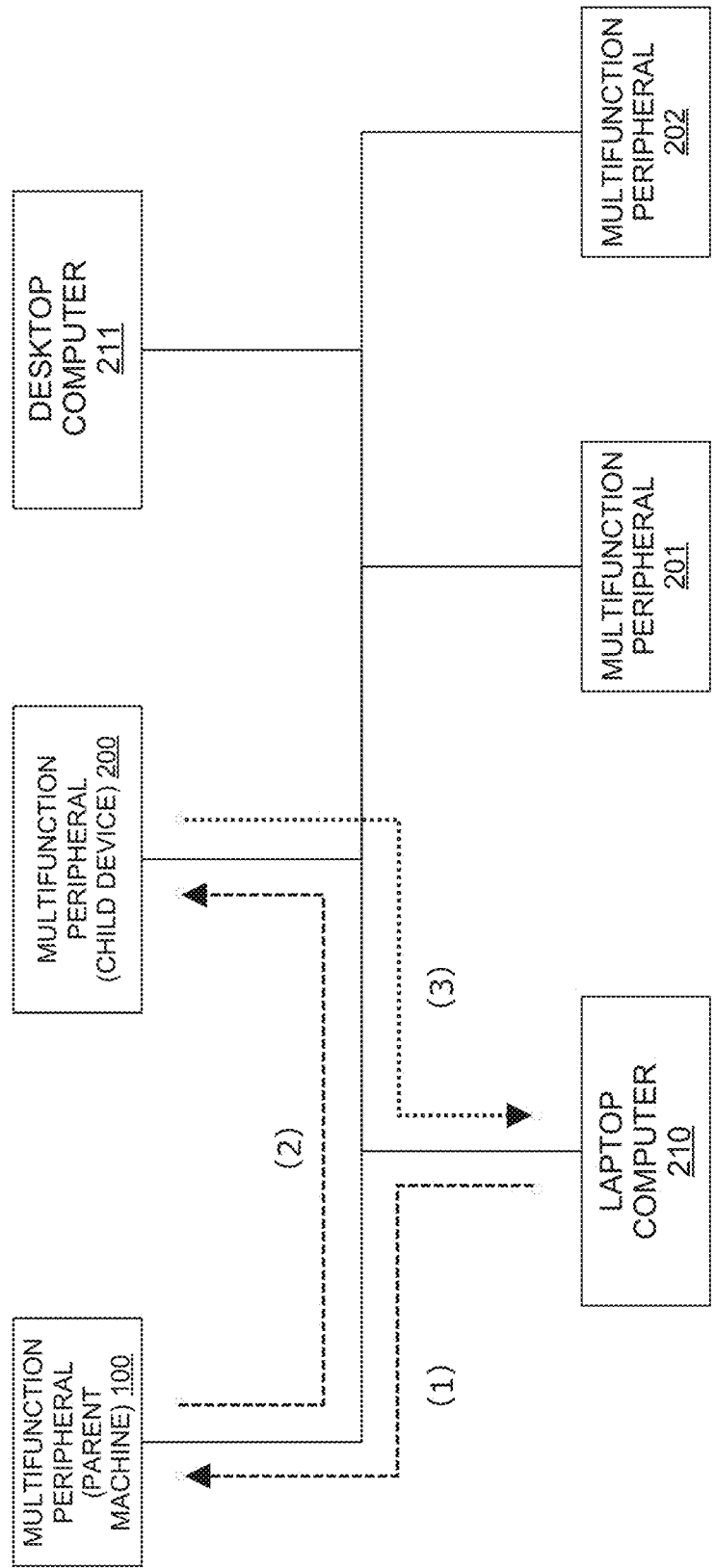
FIG. 4 is an explanatory view illustrating movement of data to be printed and notification of print completion information in this embodiment.

FIG. 4 to FIG. 8 are explanatory views, each of which explains printing using the print release function in this embodiment. FIG. 4 is an explanatory view illustrating movement of the data to be printed and notification of the print completion information in this embodiment. It is assumed that, in FIG. 4, the user has created the content to be printed, that is, the print data on the laptop computer 210, for example. In such a case, the user sends the created print data to the parent machine 100 via the network 199 (see an arrow (1) in FIG. 4).

Figure 5:
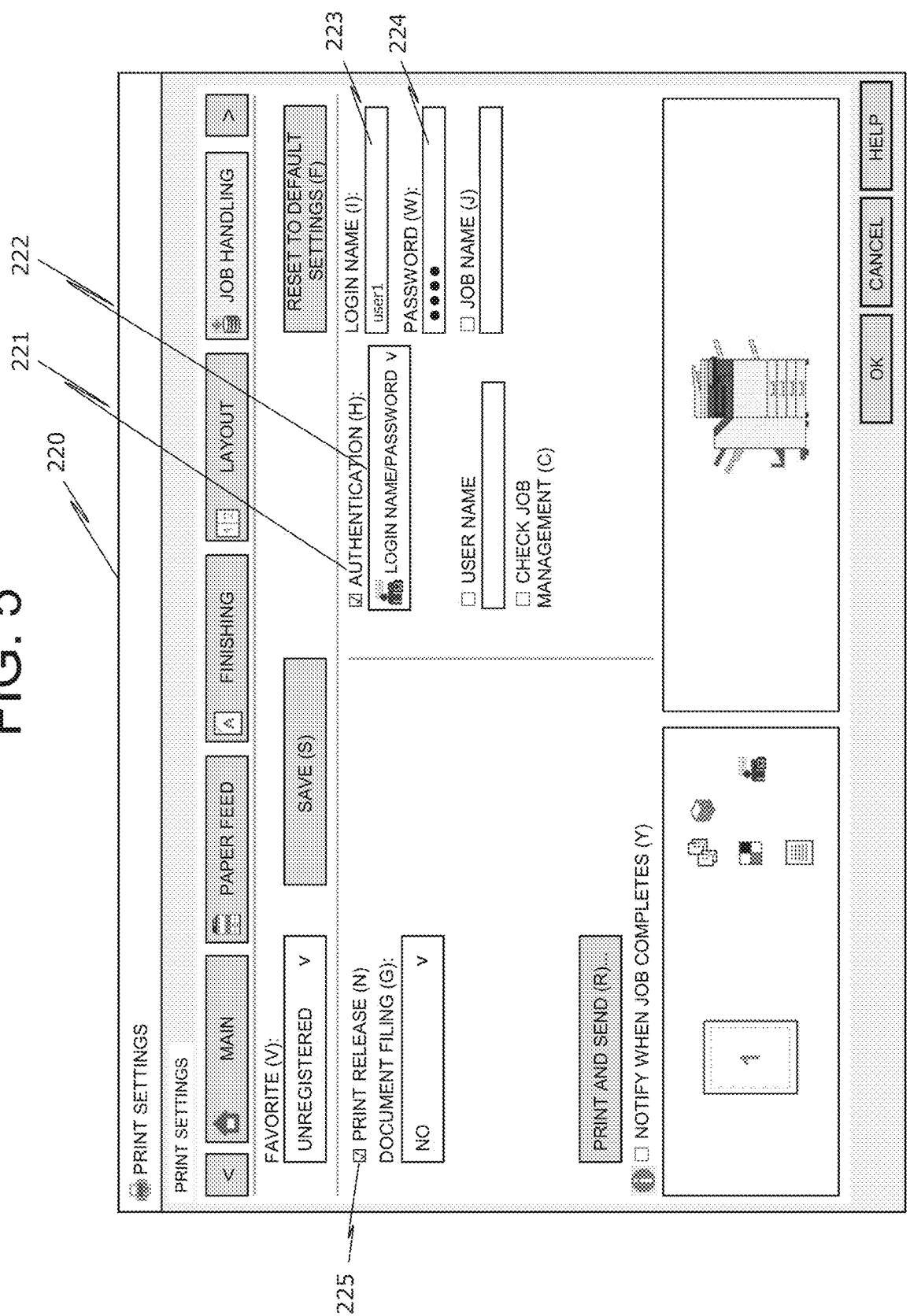
FIG. 5 is an explanatory view illustrating an example of such a setting that the print instruction device sends print data to a parent machine in this embodiment.

FIG. 5 is an explanatory view illustrating a setting made on the laptop computer 210 to send the print data to the parent machine. FIG. 5 illustrates an example of a pop-up window that is displayed by the printer driver installed in the laptop computer 210. The same applies to a case where the print data is sent from the desktop computer 211 to the parent machine.

When performing printing, the user logs in by using a login name and a password, which correspond to the user, upon necessary on a "JOB HANDLING" screen in a "PRINT SETTINGS" window 220 of the print driver illustrated in FIG. 5.

On the screen of the "PRINT SETTINGS" window 220 illustrated in FIG. 5, an "AUTHENTICATION" checkbox 221, an authentication method selection list 222, a login name input field 223, and a password input field 224 are provided. When the user checks the "AUTHENTICATION" checkbox 221, selects user authentication by "LOGIN NAME/PASSWORD" from a drop-down list in the authentication method selection list 222, inputs the login name corresponding to the user in the login name input field 223, and inputs the password in the password input field 224, the print data sending processor 121 executes the processing to generate and send the print data by using the input login name and the input password.

Of various setting items related to the processing to generate and send the print data, a "PRINT RELEASE" checkbox 225 is prepared as an option for whether to perform printing using the print release function. When the user checks the "PRINT RELEASE" checkbox 225, the print data sending processor 121 determines that printing using the print release function is selected instead of normal printing. Then, the print data sending processor 121 sends the generated print data to the multifunction peripheral, which is set as the parent machine 100 (see the arrow (1) illustrated in FIG. 4).

Figure 6:
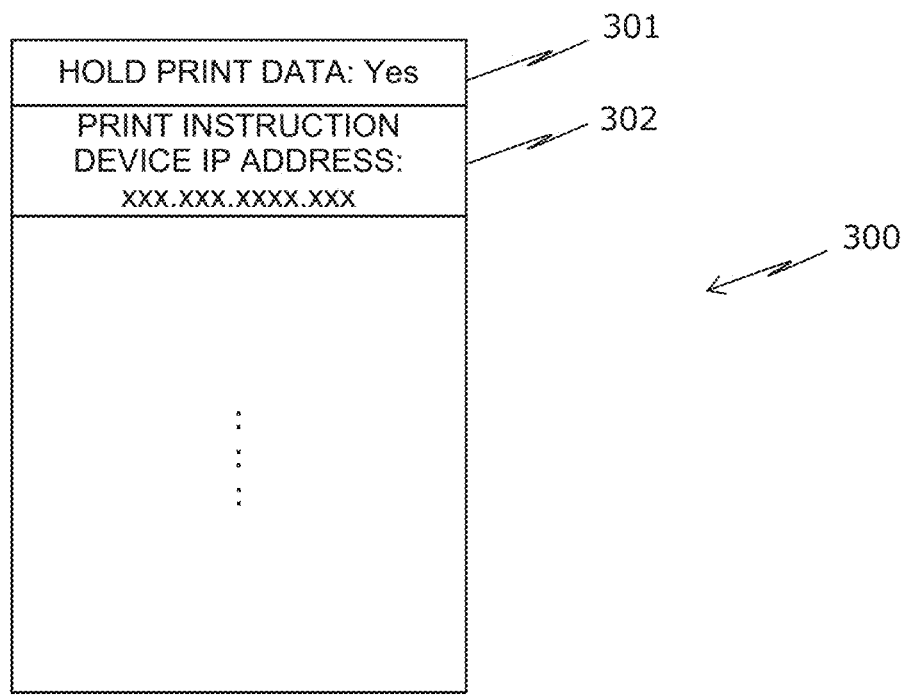
FIG. 6 is an explanatory view illustrating a data configuration of the print data related to a print release function in this embodiment.

FIG. 6 is an explanatory view illustrating a data configuration of the print data that is related to the print release function and is sent to the multifunction peripheral 100 by the laptop computer 210 in this embodiment. As illustrated in FIG. 6, print data 300 includes: print type data 301 indicating that printing is not normal printing but printing using the print release function; and print instruction device identification information 302 that identifies the laptop computer 210 as the print instruction device.

In the example illustrated in FIG. 6, the print type data 301 is a flag indicating that the print data 300 should be held in the parent machine. In addition, in the example illustrated in FIG. 6, the print instruction device identification information 302 is an IP address of the print instruction device. However, the print instruction device identification information 302 is not limited to the IP address, and only needs to be information with which the multifunction peripherals 100, 200, 201, 202 can specify the print instruction device on the network 199. In the case of printing with user authentication, the print data 300 further includes the login name and the password that are specified by the user.

The controller 104 in the multifunction peripheral 100 as the child machine that has received the print data 300 from the laptop computer 210 stores the received print data 300 in the storage device 102 of the own machine.

When the user does not check the "PRINT RELEASE" checkbox 225 illustrated in FIG. 5, the print data sending processor 121 determines that normal printing is selected. In such a case, the print data sending processor 121 displays the multifunction peripherals 100, 200, 201, 202 as options of the printers that perform printing on an operation screen, which is not illustrated in FIG. 5, in the printer driver. When the user selects any of those, the print data sending processor 121 sends the print data 300 to the selected multifunction peripheral. The multifunction peripheral that has received the print data 300 performs and outputs printing. In the case of the print data 300 that is related to normal printing without the print release function, the print type data 301, that is, the flag indicating that the print data 300 should be held in the parent machine is off (No).

What have been described so far is the procedure of the operation that is performed by the user for printing using the print release function on the laptop computer 210 as the print instruction device. It should be noted that, in the case where printing is performed using the print release function, the user further has to operate the child machine.

The user goes to a place where the multifunction peripheral (the multifunction peripheral as the child machine), from which the user desired to output the print data 300, is installed, operates the operation device 105 of such a multifunction peripheral, selects the print data 300 to be output, and causes the child machine to perform printing. The child machine may be any of the multifunction peripherals 100, 200, 201, 202. Here, it is assumed that the multifunction peripheral 200 is used as the child machine to perform printing.

Figure 7:
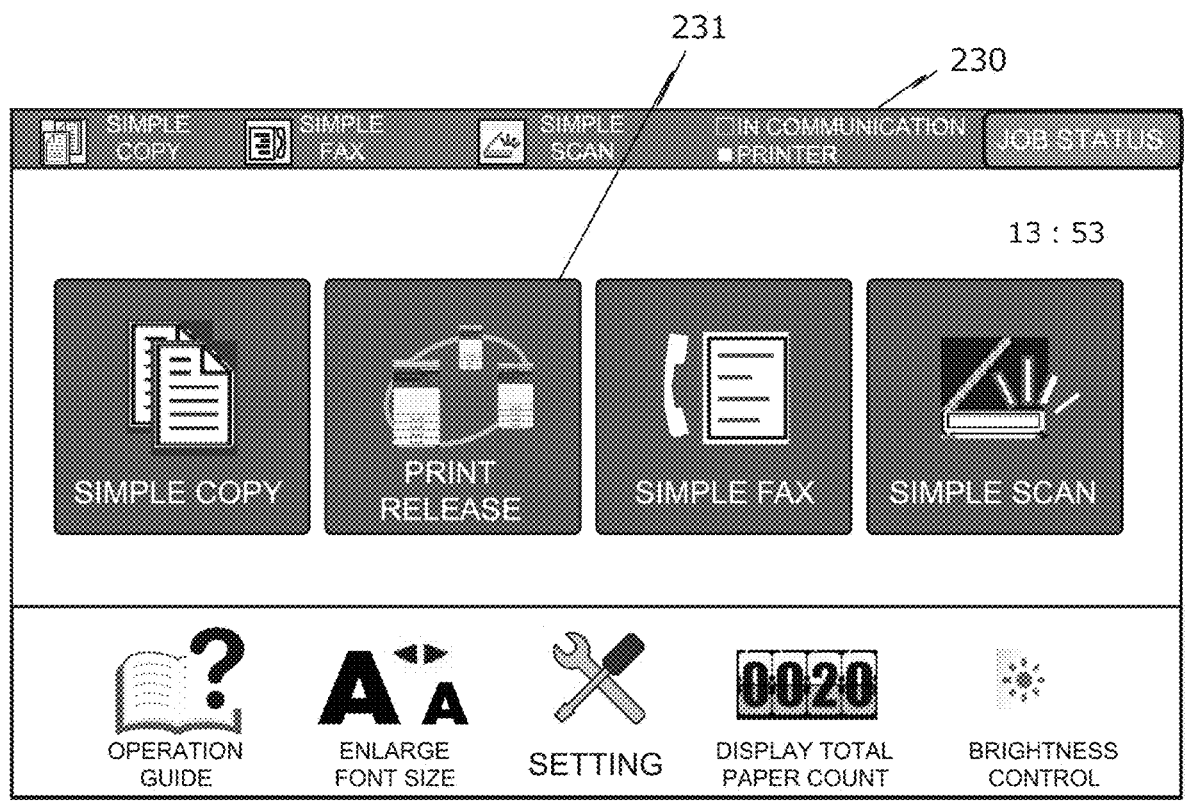
FIG. 7 is a first explanatory view of an operation screen that is related to printing using the print release function displayed in an operation device of a child machine in this embodiment.
Figure 8:
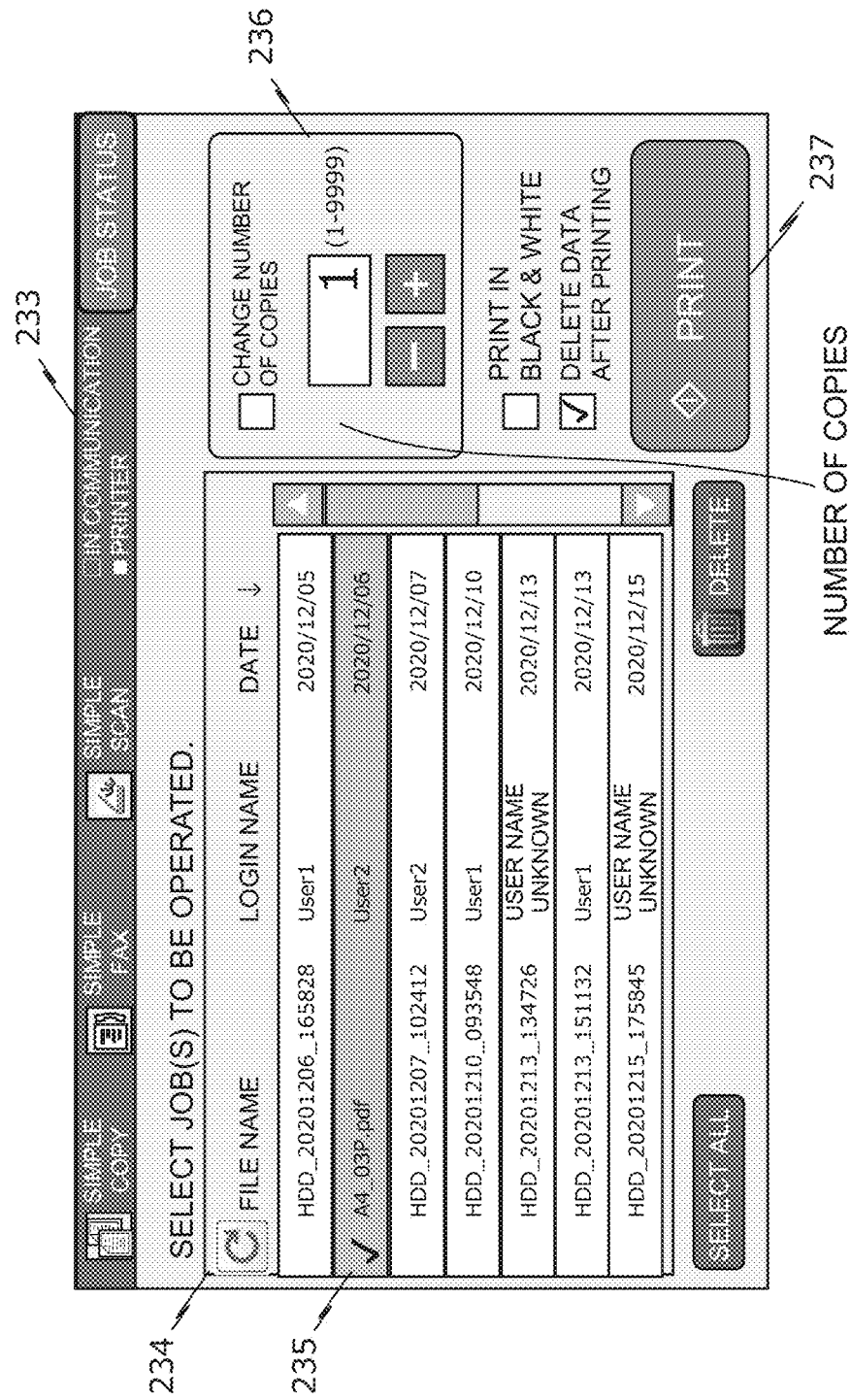
FIG. 8 is a second explanatory view of the operation screen that is related to printing using the print release function displayed in the operation device of the child machine in this embodiment.

FIG. 7 and FIG. 8 are explanatory views of operation screens that are related to printing using the print release function and are displayed in the operation device 105 of the multifunction peripheral 200 as the child machine by the controller 104. The following operation is also applicable to the case where each of the other multifunction peripherals 100, 201, 202 as the child machine performs printing. FIG. 7 is the explanatory view illustrating an example of a home screen that is displayed in the operation device 105 of the multifunction peripheral 200 as the child machine. The user goes to a place where the multifunction peripheral 200, from which the user is desired to output the print data 300, is installed, uses the screen displayed in the operation device 105, and gives an instruction for printing.

When the user touches a "PRINT RELEASE" key 231 that is displayed on the home screen 230 illustrated in FIG. 7, the controller 104 of the multifunction peripheral 200 displays a print instruction screen 233, which is illustrated in FIG. 8, in the operation device 105.

As illustrated in FIG. 8, the controller 104 displays, on the print instruction screen 233, a list of the print data (a job list 234) that is related to the print release function and is stored in the storage device 102 of the multifunction peripheral 100 as the parent machine. The job list 234 includes items of a file name, the login name associated with the print data, and a generation date of the print data for the print data of each job that is related to the print release function and is stored in the storage device 102 of the parent machine. In order to display the job list 234 on the print instruction screen 233, the controller 104 of the child machine accesses the multifunction peripheral 100, which is set as the parent machine, and acquires information on the print data of the job that is related to printing using the print release function among the print data stored in the storage device 102.

The controller 104 of the multifunction peripheral 200 as the child machine accepts the user's selection of the print data displayed in the job list 234. When the user touches any of the print data, in response to such an operation, the controller 104 determines that the touched print data has been selected, and displays the touched print data in a manner to be differentiated from the other print data. The example illustrated in FIG. 8 illustrates a state where the second print data from the top (a file A4_03P.pdf) is selected as print target data. In the job list 234, print target data 235 that is selected by the user is displayed with the gray background, and a check is displayed on a left side thereof.

In a state where any of the print data is selected from the job list 234 illustrated in FIG. 8, the controller 104 of the multifunction peripheral 200 accepts a setting of a number of copies setting field 236 in a right portion of the print instruction screen 233 and a setting of an option check box thereunder. Then, when the "PRINT" key 237 at a lower right corner is touched, in response to such an operation, the controller 104 accesses the multifunction peripheral 100 as the parent machine and requests the multifunction peripheral 100 to send the selected print data 300 of the print data stored in the storage device 102. In response to the request, the print data 300 is sent from the multifunction peripheral 100 as the parent machine to the multifunction peripheral 200 as the child machine (see an arrow (2) illustrated in FIG. 4). The controller 104 of the multifunction peripheral 200, which has received the print data 300, causes the image forming device 103 to print and output the received print data 300.

When printing is completed, the multifunction peripheral 200 as the child machine sends the print completion information to the laptop computer 210 as the print instruction device (see an arrow (3) illustrated in FIG. 4). The print data 300, which is received by the multifunction peripheral 200 as the child machine from the multifunction peripheral 100 as the parent machine, includes the print instruction device identification information 302 used to identify the laptop computer 210 as the print instruction device. In this example, the print instruction device identification information 302 is the IP address of the laptop computer 210 as the print instruction device. The multifunction peripheral 200 as a child machine uses the print instruction device identification information 302 as a clue, and sends the print completion information to the laptop computer 210 as the print instruction device.

Figure 9:
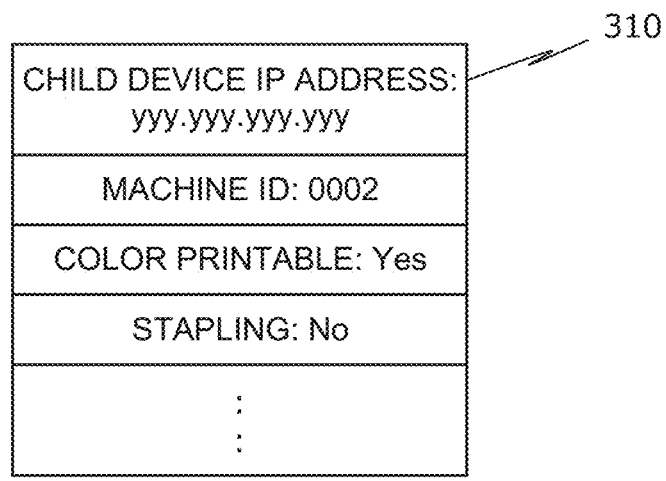
FIG. 9 is an explanatory view illustrating an example of a data configuration of the print completion information in this embodiment.

FIG. 9 is an explanatory view illustrating an example of a data configuration of the print completion information in this embodiment. In the example illustrated in FIG. 9, the print completion information 310 includes an IP address as identification information of the child machine that has performed printing. The print completion information 310 also includes a machine ID, the machine ID is a unique value owned by each of the devices connected to the network 199. The print completion information 310 further includes information on a configuration (an executable function) of the child machine for each of various print-related functions. Examples of such information are information on whether color printing is possible and information on whether stabling is possible. The machine ID may be set when a device, which is not illustrated in the drawings and manages the network 199, assigns a unique value to each of the devices connected to the network 199. Alternatively, each of the devices connected to the network 199 may set the unique value autonomously through communication according to a predetermined rule.

The description has been made so far on the example in which printing using the print release function is performed with the multifunction peripheral 200 as the child machine. The same operation procedure and processing are applied to a case where printing is performed with any of the multifunction peripherals 100, 201, 202 being set as the child machine. However, in the case where the multifunction peripheral 100 is set as the child machine, the same multifunction peripheral is used as both of the parent machine and the child machine. In such a case, the multifunction peripheral 100 displays the print data, which is stored in the storage device 102 of the own machine, as the job list 234, acquires the selected print data, and then performs printing. Accordingly, the processing to acquire the information on the print data, which is stored in the storage device 102 of the parent machine, in order to display the job list 234 and the processing to acquire the print data, which is selected by using the job list 234, are executed within the multifunction peripheral 100 and is not accompanied by the communication through the network 199.

In this embodiment, the multifunction peripheral 202, which only has the function as the child machine, does not send the print completion information to the print instruction device even when performing printing using the print release function.

Switching of Parent Machine Setting Based on Print Frequency of Child Machine

The print history manager 123 in the laptop computer 210 as the print instruction device manages history of printing using the print release function.

FIG. 10 is an explanatory view illustrating a print management table 320, which is used by the print history manager 123 to manage the history, in this embodiment. As illustrated in FIG. 10, in the print management table 320, of the multifunction peripherals 100, 200, 201, 202 that are connected to the network 199, the multifunction peripherals 100, 200, 201, each of which can function as the parent machine, are set as management targets. This is because the print management table 320 is used to manage switching of the parent machine setting on the basis of a print frequency.

In this embodiment, in the print management table 320, the parent machine setting, a child machine usage counter, the IP address, and a child machine attribute are stored for each of the target multifunction peripherals. The item of the parent machine setting indicates the multifunction peripheral that is currently set as the parent machine. In the example illustrated in FIG. 10, the multifunction peripheral 100 is set as the parent machine. The item of the child machine usage counter is a counter that stores how much each of the multifunction peripherals has been used as the child machine for printing. When receiving the print completion information 310 (see FIG. 9) from the child machine, the print history manager 123 specifies the child machine as a sending source from the IP address included in the print completion information, and increases the corresponding child machine usage counter. In this example, the child machine usage counter is only increased by one. However, the present invention is not limited thereto. For example, in the case where a use frequency of the child machine corresponds to number of printed pages, the child machine usage counter may only be increased by the number of printed pages. Here, instead of determining the IP address included in the print completion information and specifying the corresponding child machine usage counter, the machine ID included in the print completion information may be determined, so as to specify the corresponding child machine usage counter.

The print history manager 123 may reset all the child machine usage counters when the parent machine setting device 124, which will be described below, sets a new parent machine. Alternatively, every time a predetermined time period elapses, the print history manager 123 may reset all the child machine usage counters.

In the item of the IP address in the print management table 320, the IP address that is included in the latest print completion information received from the child machine is stored. In the item of the child machine attribute, the machine ID and information on the configuration of the child machine, which are included in the latest print completion information received from the child machine, are stored.

The parent machine setting device 124 refers to the print management table 320, which is managed by the print history manager 123, and executes processing to update the parent machine setting.

In addition, when the print data sending processor 121 sends the print data to the parent machine, the parent machine setting device 124 refers to the print management table 320 and specifies the multifunction peripheral with the largest value of the child machine usage counter among the multifunction peripherals as the management targets. That is, the parent machine setting device 124 specifies the multifunction peripheral that is most frequently used for printing using the print release function. In the example illustrated in FIG. 10, the value 10 of the child machine usage counter of the multifunction peripheral 200 is the largest. However, the multifunction peripheral 100 is currently set as the parent machine.

The parent machine setting device 124 switches the parent machine setting from the current multifunction peripheral 100 to the multifunction peripheral 200, which is most frequently used for printing using the print release function, on the basis of a determination result.

More specifically, in the parent machine setting for the parent management table 320, the parent machine setting device 124 changes the parent machine from the multifunction peripheral 100 to the multifunction peripheral 200. Then, the parent machine setting device 124 notifies the print data sending processor 121 that the parent machine as the print data sending destination is changed from the previous multifunction peripheral 100 to the new multifunction peripheral 200. In this way, the print data is sent to the multifunction peripheral 200.

Furthermore, the parent machine setting device 124 notifies all the multifunction peripherals, each of which is connected to the network 199 and can function as the child machine, that is, the multifunction peripherals 100, 200, 201, 202 that the parent machine setting has been changed from the previous multifunction peripheral 100 to the new multifunction peripheral 200. This is done to make the multifunction peripheral 200, which is set as the new parent machine, store the print data sent from the print instruction device in the storage device 102. This is also done to make each of the child machines acquire the print data from the multifunction peripheral 200, which is newly set as the parent machine.

Flowchart Related to Processing to Switch Parent Machine

In this embodiment, a description will be made on processing executed by the processor 115 of the laptop computer 210 as the print instruction device and processing executed by the controller 104 of the multifunction peripheral 200 as the child machine with reference to flowcharts. It should be noted that the processing as the parent machine will not be described with reference to a flowchart.

In this embodiment, it is assumed that only one parent machine is set in the network 199.

Figure 11:
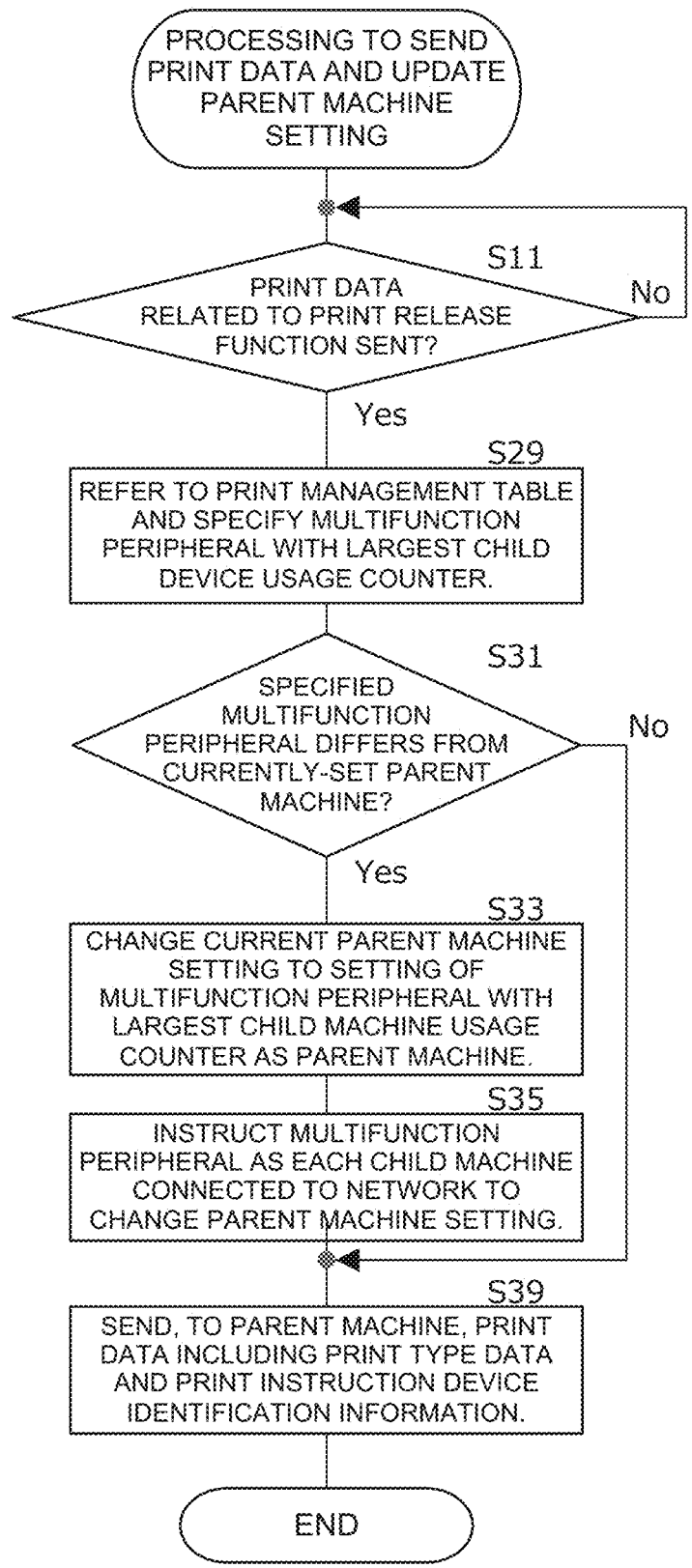
FIG. 11 is a flowchart illustrating processing that is executed by the print instruction device as a print data sending processor and a parent machine setting device in a first embodiment.

FIG. 11 is a flowchart illustrating processing that is executed by the processor 115 of the laptop computer 210 as the print data sending processor 121 and the parent machine setting device 124.

As illustrated in FIG. 11, the processor 115 as the print data sending processor 121 waits for a phase where the user selects printing using the print release function and the print data is sent to the parent machine (step S11). When such a phase arrives, the processor 115 as the parent machine setting device 124 refers to the print management table 320, and specifies the multifunction peripheral with the largest value of the child machine usage counter among the multifunction peripherals that are registered in the print management table 320 (step S29). Then, it is determined whether the specified multifunction peripheral differs from the currently-set parent machine (step S31).

If the multifunction peripheral that corresponds to the largest value of the child machine usage counter differs from the currently-set parent machine (Yes in step S31), the processor 115 as the parent machine setting device 124 executes parent machine changing processing so as to change the currently-set parent machine to the multifunction peripheral that corresponds to the largest value of the child machine usage counter. That is, the sending destination of the print data related to the print release function is changed to the multifunction peripheral that corresponds to the largest value of the child machine usage counter (step S33). In the example illustrated in FIG. 10, the parent machine setting is changed from the multifunction peripheral 100, which is currently set as the parent machine, to the multifunction peripheral 200. In this embodiment, the multifunction peripherals that are registered in the print management table 320 are limited to those that can function as the parent machine. Such a mechanism will be described below.

Next, the processor 115 as the parent machine setting device 124 instructs the multifunction peripherals 100, 200, 201, 202, which are connected to the network 199 and can function as the child machines, to change the parent machine setting (step S35). Here, the processor 115 adds the IP address of the multifunction peripheral, which is newly set as the parent machine, to the instruction for changing the parent machine setting. The IP address of the multifunction peripheral that corresponds to the new parent machine can be acquired by referring to the print management table 320. In the example illustrated in FIG. 10, the processor 115 instructs the multifunction peripherals 100, 200, 201, 202 to change the parent machine setting from the multifunction peripheral 100 to the multifunction peripheral 200.

Then, the processor 115 as the print data sending processor 121 sends the print data related to the print release function (see FIG. 6) to the set parent machine (step S39). In the example illustrated in FIG. 10, the print data is sent to the newly set multifunction peripheral 200.

In the determination of above-described step S31, if the specified multifunction peripheral is the same as the current parent machine (No in step S31), the parent machine setting is not changed (the processing in steps S33, S35 is skipped), and the print data related to the print release function is sent to the parent machine (step S39).

Next, a description will be made on processing by the child machine that has received the instruction for changing the parent machine setting.

Figure 12:
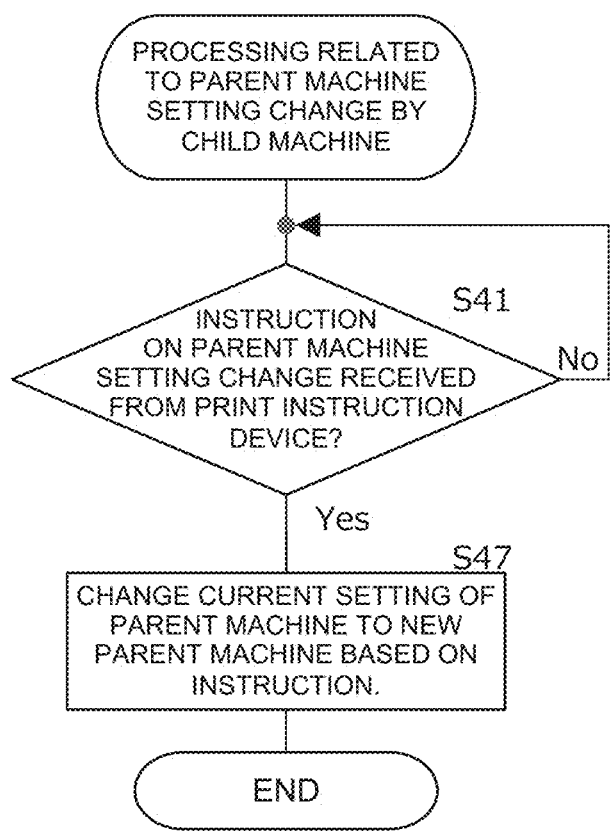
FIG. 12 is a flowchart illustrating processing that is executed by a controller of the child machine that has received an instruction for changing a parent machine setting in the first embodiment.

FIG. 12 a flowchart illustrating processing that is executed by the controller 104 of the child machine that has received the instruction for changing the parent machine setting. As illustrated in FIG. 12, when receiving the instruction for changing the parent machine setting from the print instruction device (Yes in step S41), the controller 104 of each of the multifunction peripherals 100, 200, 201, 202, each of which can function as the child machine, executes the following processing. That is, the current parent machine setting is changed to the new parent machine on the basis of the received instruction (step S47), and then the processing is terminated.

In this embodiment, the IP address that corresponds to the new parent machine is added to the instruction for changing the parent machine setting. The storage device 102 stores the IP address of the currently-set parent machine. The controller 104 replaces the IP address of the parent machine stored in the storage device 102 with the IP address that is added to the instruction for changing the parent machine setting.

Next, a description will be made on the processing by the child machine related to printing using the print release function.

Figure 13:
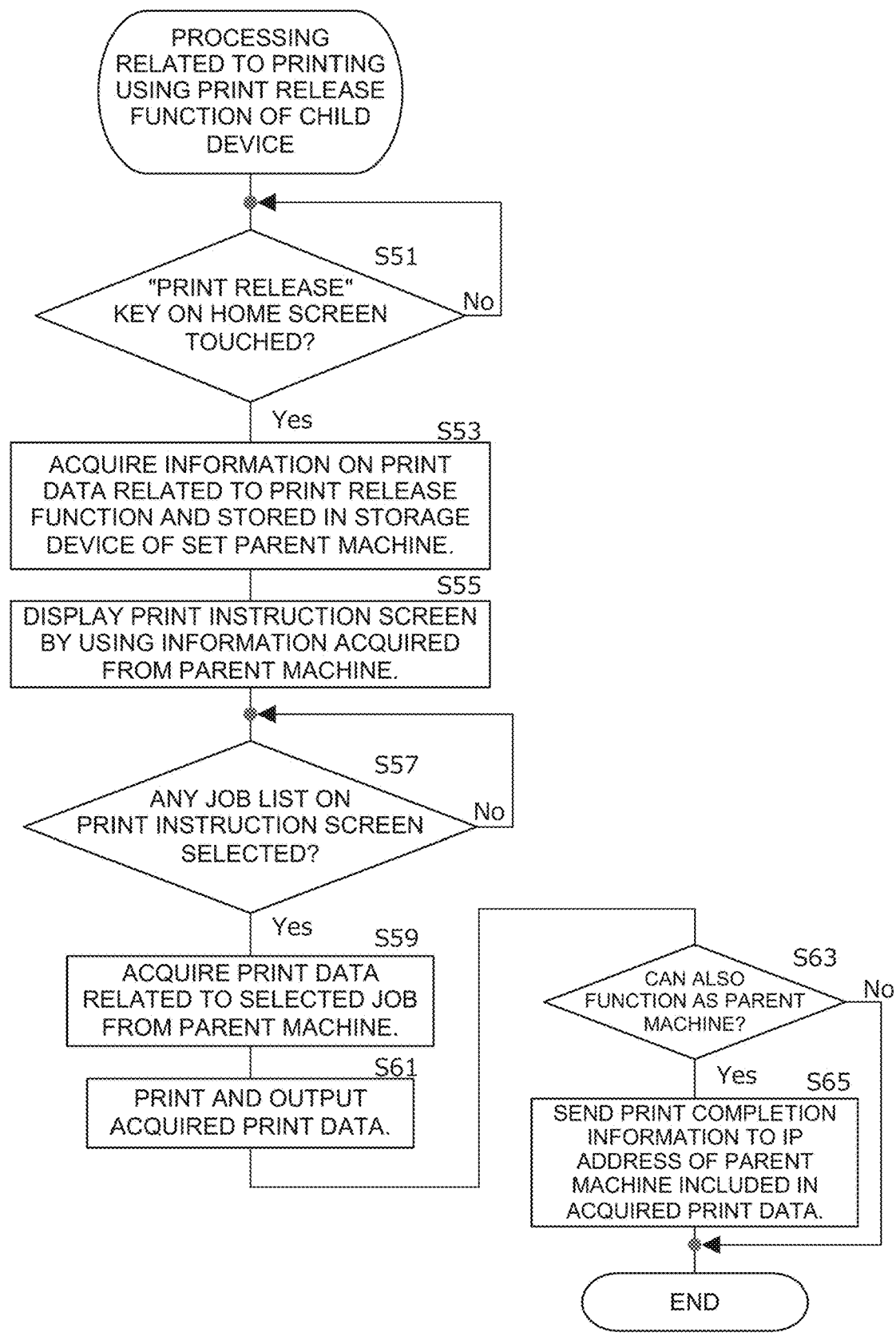
FIG. 13 is a flowchart illustrating processing that is executed by a controller of the child machine at the time of printing using the print release function in the first embodiment.

FIG. 13 is a flowchart illustrating processing that is executed by the controller 104 of the multifunction peripheral that functions as the child machine at the time of printing using the print release function in this embodiment. As illustrated in FIG. 13, when recognizing that the "PRINT RELEASE" key 231 is touched on the home screen 230 (Yes in step S51), the controller 104 accesses the currently-set parent machine. Then, the controller 104 acquires information on the print data that is related to the print release function and is stored in the storage device 102 of the parent machine (step S53). Next, the controller 104 causes the operation device 105 to display the print instruction screen 233 and display the job list 234 on the print instruction screen 233 by using the information acquired from the parent machine (step S55).

When the user selects the print data related to any of the jobs in the job list 234 (Yes in step S57), the controller 104 acquires the print data related to the selected job (see FIG. 6) from the parent machine (step S59). Then, printing using the acquired print data is performed (step S61).

After printing is completed, the controller 104 of the child machine determines whether the own machine can also function as the parent machine (step S63). Only when the own machine can also function as the parent machine (Yes in step S65), the controller 104 sends the print completion information to the print instruction device (step S65), and the processing is terminated. The IP address of the print instruction device as the sending destination is included in the print data.

In the determination of step S63, if the own machine only functions as the child machine (No in step S63), the print completion information is not sent to the print instruction device.

Since the print completion information is only sent from the multifunction peripheral that can function as the parent machine, as will be described below, only the multifunction peripherals that can function as the parent machine are registered in the print management table 320 of the print instruction device, and the child machine usage counter is increased by one.

Figure 14:
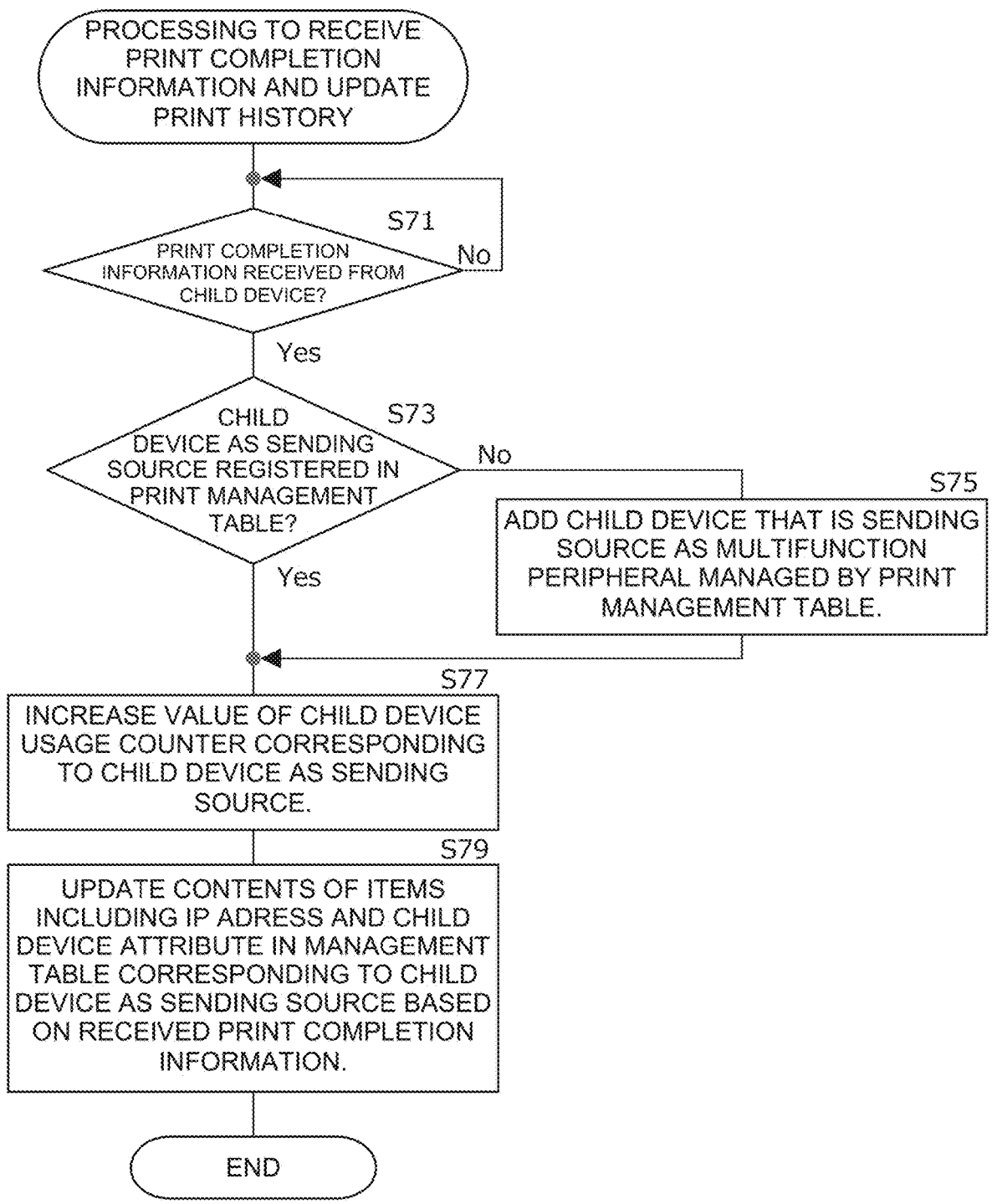
FIG. 14 is a flowchart illustrating processing that is executed by a processor of the print instruction device in relation to reception of the print completion information and update of print history in the first embodiment.

FIG. 14 is a flowchart illustrating processing that is executed by the processor 115 of the print instruction device in relation to reception of the print completion information and update of the print history.

As illustrated in FIG. 14, when the processor 115 as the print completion reception processor 122 receives the print completion information from the child machine (Yes in step S71), the processor 115 as the print history manager 123 determines whether the child machine as the sending source has already been registered in the print management table 320 (step S73). If the child machine as the sending source has already been registered (Yes in step S73), the processing proceeds to processing to increase the corresponding child machine usage counter. On the other hand, if the child machine as the sending source has not been registered (No in step S73), the processor 115 registers the child machine as the sending source in the print management table 320 (step S75).

Then, the processor 115 as the print completion reception processor 122 increases the value of the child machine usage counter, which corresponds to the child machine as the sending source, by one (Step S77).

Furthermore, the processor 115 as the print completion reception processor 122 updates the contents of the items of the IP address and the child machine attribute, which correspond to the child machine as the sending source, in the management table on the basis of the received print completion information (step S79), and the processing is terminated.

What have been described so far is the processing that is executed by the print instruction device and the child machine for printing using the print release function.

Second Embodiment

Processing Related to Parent Machine Setting

In the first embodiment, it is assumed that the only one parent machine exists in the network 199. Meanwhile, in this embodiment, existence of the plural parent machines is permitted. Of the child machines, each of which has a print function corresponding to the setting of printing using the print release function, the child machine with the high use frequency is set as the parent machine.

For example, a description on this embodiment will be made by using an example in which the setting of printing using the print release function is a setting using a stapler. According to the print management table 320 illustrated in FIG. 10, the multifunction peripheral 201 can staple the printed pages while the multifunction peripheral 100 and the multifunction peripheral 200 cannot stable the printed pages.

In the case where the laptop computer 210 functions as the print instruction device, the processor 115 thereof as the parent machine setting device 124 refers to the print management table 320 and specifies the multifunction peripheral with the largest value of the child machine usage counter. At the time, instead of targeting all the multifunction peripherals that are registered in the print management table 320, the processor 115 as the parent machine setting device 124 only targets the multifunction peripherals capable of stapling the printed pages and specifies the multifunction peripheral with the largest value of the child machine usage counter. In the example illustrated in FIG. 10, since only the multifunction peripheral 201 can staple the printed pages, the multifunction peripheral 201 is specified as a candidate for the parent machine.

Accordingly, in the case where a stapling function is used for printing using the print release function, the parent machine setting device 124 switches the parent machine setting to the multifunction peripheral 201. On the other hand, in the case where the stapling function is not used for printing using the print release function, as described in the first embodiment, the parent machine setting device 124 switches the parent machine setting to the multifunction peripheral 200.

As another example, a description will be made on a case where printing using the print release function is color printing. In the example illustrated in FIG. 10, while the multifunction peripherals 200, 201 handle color printing, the multifunction peripheral 100 does not handle color printing. Accordingly, the parent machine setting device 124 specifies, of the multifunction peripherals 200, 201 capable of performing color printing, the multifunction peripheral 200 as the multifunction peripheral with the largest value of the child machine usage counter.

Thus, in the case where printing using the print release function is color printing, the parent machine setting device 124 switches the parent machine setting to the multifunction peripheral 200. As it has been described in the first embodiment, the parent machine setting is also switched to the multifunction peripheral 200 when printing is not color printing. Thus, the same result is obtained regardless of whether printing is color printing. However, in regard to targeting of the multifunction peripheral with the largest value of the child machine usage counter, the parent machine setting differs between color printing and monochrome printing.

As in this embodiment, in the case where the plural parent machines exist in the network 199, it is necessary for the child machine to know which parent machine stores the print data when the child machine performs printing. This is accomplished as follows.

First, in the case where the IP address of the new parent machine is not registered as that of the parent machine, the parent machine setting device 124 of the print instruction device instructs each of the multifunction peripherals as the child machines connected to the network 199 to additionally register the IP address of the new parent machine at the time of setting the new multifunction peripheral as the parent machine. That is, in the first embodiment, the description has been made that, when changing the parent machine setting, the print instruction device sends, to each of the multifunction peripherals as the child machines connected to the network 199, the instruction for changing the parent machine setting, to which the IP address of the multifunction peripheral to be set as the parent machine is added. In this embodiment, instead of the above, the print instruction device sends, to each of the multifunction peripherals as the child machines, the instruction for adding the parent machine setting, to which the IP address of the multifunction peripheral to be set as the parent machine is added, and instructs each of the multifunction peripherals as the child machines to register such an IP address when the multifunction peripheral specified by such an IP address is not registered as the parent machine yet.

In addition, the description on the first embodiment has been made that, when displaying the job list 234 on the print instruction screen 233, the controller 104 of the child machine accesses the parent machine, and acquires the information on the print data, which is related to the print release function and is stored in the storage device 102 of the parent machine. In this embodiment, the controller 104 of the child machine requests, to each of the multifunction peripherals capable of functioning as the parent machine connected to the network 199, for the information on the print data related to the print release function and stored in the storage device 102. As the parent machine, the multifunction peripheral that stores the corresponding print data in the storage device 102 sends such information to the child machine.

When receiving the information on the stored print data from the plural parent machines, the controller 104 of the child machine associates each of those pieces of the information with the parent machine as the sending source, stores such information in the storage device 102 of the child machine, and displays the job list 234. Accordingly, the information on the print data, which is displayed in the job list 234 by the controller 104 of the child machine, is linked with the parent machine as the storage source and is stored in the storage device 102 of the child machine. When user selects any of the print data, the controller 104 of the child machine acquires the print data from the parent machine that is linked to the information on the selected print target data 235.

Flowcharts

Figure 15:
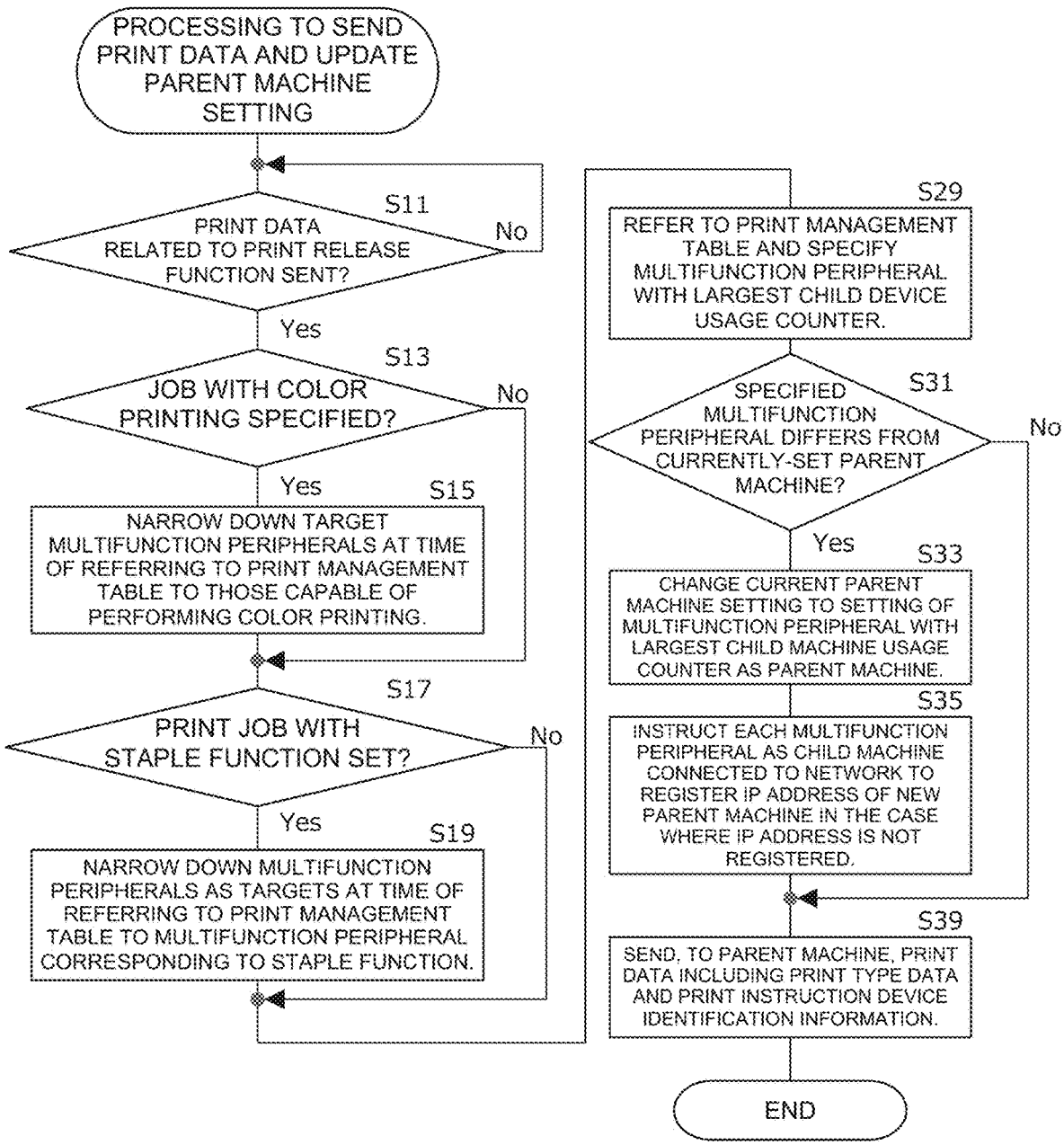
FIG. 15 is a flowchart illustrating processing that corresponds to FIG. 11 in a second embodiment.

FIG. 15 is a flowchart in this embodiment that corresponds to FIG. 11 in the first embodiment. Processing that corresponds to the processing in FIG. 11 will be denoted by the same reference numeral, and thus the description on the same processing will not be made.

As illustrated in FIG. 15, the processor 115 as the print data sending processor 121 executes the following processing when a phase of sending the print data related to the print release function arrives (Yes in step S11). That is, the processor 115 determines whether a specific function is set for the print job. In the case where the specific function is set, the processor 115 narrows down the target multifunction peripherals at the time of referring to the print management table 320.

In the example illustrated in FIG. 15, first, the processor 115 as the parent machine setting device 124 determines whether the print job is a print job specified with color printing (step S13). If color printing is specified (Yes in step S13), the target multifunction peripherals at the time of referring to the print management table in step S29, which will be described below, are narrowed down to those capable of performing color printing (step S15).

Next, the processor 115 determines whether the print job is a print job with the staple function being set (step S17). If the staple function is set (Yes in step S17), the target multifunction peripherals at the time of referring to the print management table in step S29, which will be described below, are narrowed down to those capable of using the staple (step S19).

FIG. 15 illustrates the determinations on color printing and the staple function. However, a similar determination may be made for another print setting for narrowing down.

Subsequent processing, which is executed by the processor 115, is substantially the same as that in the first embodiment.

The processor 115 as the parent machine setting device 124 refers to the print management table 320 and specifies, of the multifunction peripherals registered in the print management table 320, the multifunction peripheral with the largest value of the child machine usage counter (step S29). A point that differs from the first embodiment is that the multifunction peripheral narrowed down by the determinations in steps S13 to S19 is targeted. Then, it is determined whether the specified multifunction peripheral differs from the currently-set parent machine (step S31).

If the multifunction peripheral that corresponds to the largest value of the child machine usage counter differs from the currently-set parent machine (Yes in step S31), the processor 115 as the parent machine setting device 124 executes the parent machine changing processing so as to change the currently-set parent machine to the multifunction peripheral that corresponds to the largest value of the child machine usage counter (step S33).

Next, the processor 115 as the parent machine setting device 124 instructs the multifunction peripherals, which can function as the child machines, to register the IP address of the new parent machine in the case where the IP address of the new parent machine is not registered (step S35). In this way, the new parent machine is additionally registered. Similar to the first embodiment, also in this embodiment, there is a case where the currently-set parent machine is simply changed to the multifunction peripheral with the largest value of the child machine usage counter. In such a case, as in step S35 described in the embodiment, the processor 115 as the parent machine setting device 124 instructs each of the multifunction peripherals as the child machines to simply change the parent machine setting.

Then, the processor 115 as the print data sending processor 121 sends the print data related to the print release function (see FIG. 6) to the set parent machine (step S39).

If the specified multifunction peripheral is the same as the current parent machine (No in step S31), the parent machine setting is not changed (the processing in steps S33, S35 is skipped), and the print data related to the print release function is sent to the parent machine (step S39).

Next, a description will be made on processing by the child machine that has received the instruction for registering the parent machine in this embodiment.

Figure 16:
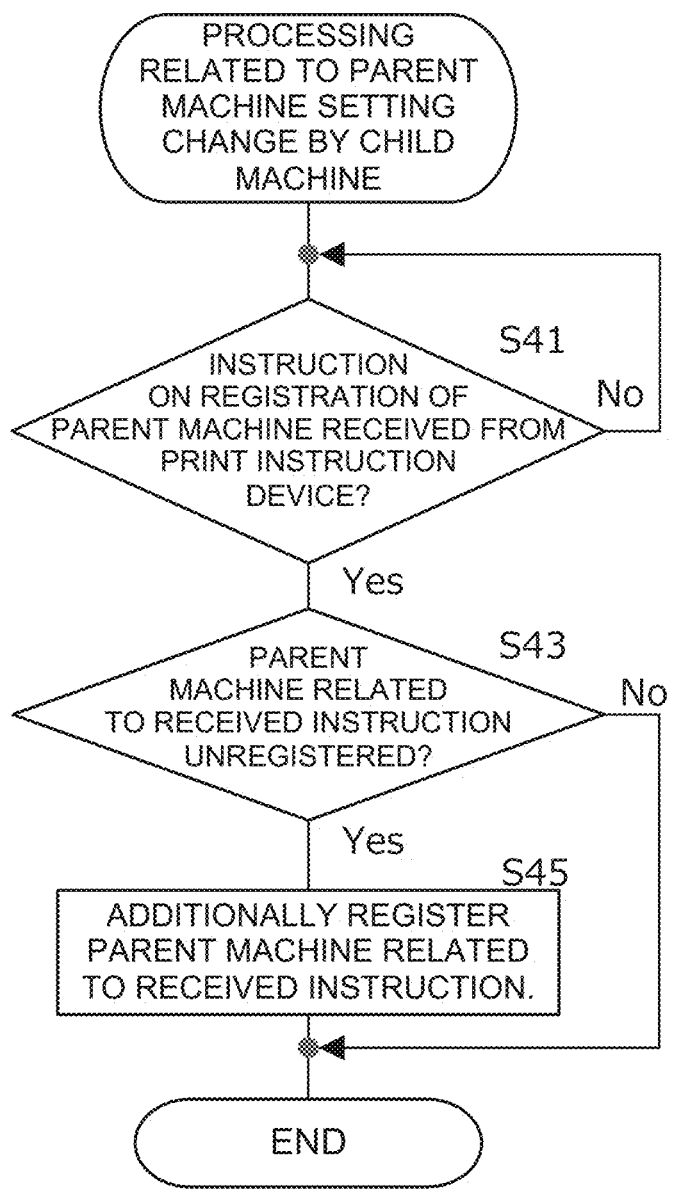
FIG. 16 is a flowchart illustrating processing that corresponds to FIG. 12 in the second embodiment.

FIG. 16 is a flowchart illustrating processing that is executed by the controller 104 of the child machine that has received the instruction for registering the parent machine in this embodiment. FIG. 16 is a flowchart that corresponds to FIG. 12 in the first embodiment.

As illustrated in FIG. 16, when receiving the instruction for registering the parent machine from the print instruction device (Yes in step S41), the controller 104 of each of the multifunction peripherals capable of functioning as the child machines determines whether the parent machine related to the received instruction is unregistered or has already been registered as the parent machine (step S43). If the parent machine related to the received instruction is the unregistered parent machine (Yes in step S43), the parent machine related to the received instruction is additionally registered as the new parent machine (step S45), and the processing is terminated.

The processing corresponding to FIG. 13 and FIG. 14 is substantially the same as the processing in the first embodiment and can easily be assumed by those skilled in the art from the contents described for the processing of the parent machine setting. Thus, the description thereon will not be made.

Third Embodiment

In the first embodiment, the description has been made that the multifunction peripheral that only functions as the child machine does not send the print completion information. In this embodiment, a further detailed description thereon will be made.

The multifunction peripheral that only functions as the child machine can also be configured to send the print completion information to the print instruction device, and such an aspect is also included in the scope of the present invention. In such a case, whether the multifunction peripheral can function as the parent machine can be included in the child machine attribute of the print completion information and sent to the print instruction device. This is to prevent the print history manager 123 of the print instruction device from increasing the child machine usage counter for the multifunction peripheral that only functions as the child machine.

However, in this embodiment, the child machine usage counter is used to set the multifunction peripheral, which has the highest print frequency as the child machine, as the parent machine. It is meaningless to include the multifunction peripheral, which cannot function as the parent machine and only functions as the child machine, as the management target as inclusion of such a multifunction peripheral merely increases a communication load and a processing load.

Thus, in this embodiment, the multifunction peripheral, which only functions as the child machine, does not send the print completion information to the print instruction device even when performing printing using the print release function.

In regard to the child machine, from which the print completion information is not received, the print history manager 123 of the print instruction device does not register such a child machine in the print management table 320. This is because, as illustrated in steps S71 to S75 in FIG. 14, upon reception of the print completion information from the child machine, the print history manager 123 registers the child machine as the sending source in the print management table 320.

The multifunction peripheral that only functions as the child machine is configured not to send the print completion information. In this way, the multifunction peripheral that only functions as the child machine is not the target for the print management table 320, which prevents the communication load and the processing load from being increased wastefully.

As it has been described so far, (i) the print instruction device according to the present invention includes: the communicator that communicates with the plural printers, each of which has the function as the parent machine storing the print data and has the function as the child machine acquiring and printing the print data; the print data sending processor that sends the print data to be stored in the parent machine; the print completion reception processor that receives the print completion information from the child machine that has printed the print data; the print history manager that updates the print-related history of the corresponding printer on the basis of the received print completion information; and the parent machine setting device that specifies the most frequently used printer on the basis of the updated history when sending the new print data, switches the parent machine to the specified printer when the specified printer differs from the parent machine, and causes the switched parent machine to send the new print data.

The present invention relates to the print instruction device that is communicably connected to the printer that has the function as the print server (the parent machine) storing the print data and the function as the child machine acquiring and printing the print data stored in the parent machine. A specific aspect thereof is an information processor such as a personal computer having a communication function, for example. The plural printers include at least one printer that has the functions as both of the parent machine and the child machine, and another printer may be the printer that only has the function as the child machine.

The laptop computer and the desktop computer, which are illustrated in FIG. 1 in the above-described embodiment, each correspond to the print instruction device of the present invention.

The print history manager manages the history of printing using the print release function, and the content of the history is related to switching of the parent machine. A specific example of such an aspect is the print management table, which is illustrated in FIG. 10 in the above-described embodiment. For each of the multifunction peripherals that can function as the parent machines, the print management table manages whether the multifunction peripheral is currently set as the parent machine, the number of printing the multifunction peripheral has performed as the child machine, the IP address used to differentiate the multifunction peripheral from the other multifunction peripherals, and the child machine attribute indicative of the functions related to the print settings that can be handled by the multifunction peripheral as the child machine.

The parent machine setting device refers to the print management table and changes the setting to set the most frequently used printer as the parent machine.

In the case where the parent machine that stores the print data related to the print release function and the child machine that prints such print data are the same multifunction peripheral, processing to transfer the print data and information thereon via the network is no longer necessary. As a result, the print job can efficiently be processed. According to the present invention, the child machine that has performed printing using the print release function notifies the print instruction device of the information upon completion of printing, and the print instruction device aggregates the information. Then, the child machine with the high print frequency is autonomously changed to be the parent machine. As a result, the print job can efficiently be processed.

Furthermore, a description will be made on preferred aspects of the present invention.

(ii) The print history manager may count the number of times the print completion information is received for each of the child machines as the sending sources, and the parent machine setting device may refer to the number of times the print completion information is received, which is counted for each of the child machines, and specify the most frequently used printer.

In this way, the most frequently used printer can be specified by counting, for each of the child machines, the number of times the print completion information is received.

(iii) When switching the parent machine setting, the parent machine setting device may send the instruction to each of the printers having the function as the child machine, so as to switch the parent machine setting to the specified printer.

In this way, in the case where the parent machine setting is switched, switching can be performed in a state where consistency with each of the printers as the child machines is maintained.

(iv) The print completion information may include child machine differentiating information and information on the print function executable by the child machine. The child machine differentiating information is used to differentiate the child machine that has performed printing from the other child machine.

In this way, of the child machines having the print function corresponding to the print setting, the child machine with the high use frequency can be set as the parent machine by using the information on the print function executable by the child machine, which is provided by the child machine.

(v) The print history manager may manage, for each of the child machines, the information on the print function executable by the child machine on the basis of the received print completion information, and in the case where the specific print function is used for printing of the print data, the parent machine setting device may narrow down the target to the printer capable of implementing the print function as the child machine, and specify the most frequently used printer.

In this way, the consistency can be secured by notifying each of the printers as the child machines of switching of the parent machine setting at the time of switching the parent machine setting.

(vi) The communicator may further communicate with another printer that only has the function as the child machine, the printer that has the functions as the parent machine and the child machine may send the print completion information after printing of the print data, the printer that only has the function as the child machine may not send the print completion information after printing the print data, and the parent machine setting device may execute the processing to switch the parent machine on the basis of the print-related history of the corresponding printer that is updated on the basis of the received print completion information.

In this way, in the case where the printer that only has the function as the child machine does not send the print completion information, the parent machine setting can be managed by using the print management table, from which the printer that only has the function as the child machine is excluded.

(vii) An aspect of the present invention includes a print control method including: sending the print data to be stored in the parent machine by the controller of the print instruction device that communicates with the plural printers, each of which has the function as the parent machine storing the print data and has the function as the child machine acquiring and printing the print data; receiving the print completion information from the child machine that has printed the print data; updating the print-related history of the corresponding printer on the basis of the received print completion information; and specifying the most frequently used printer on the basis of the updated history when sending the new print data, switching the parent machine to the specified printer when the specified printer differs from the current parent machine, and sending the new print data to the switched parent machine.

The aspect of the present invention includes combinations of any of the above-described plural aspects.

Various modified embodiments of the present invention can be implemented in addition to the above-described embodiments. Such modified embodiments should not be construed as not falling within the scope of the present invention. The present invention is embodied by the claims and their equivalents, and should embrace all of the modifications within the scope of the above.

What is claimed is:

1. A print instruction device comprising:
a communicator that communicates with plural printers, each of which has a function as a parent machine storing print data and has a function as a child machine acquiring and printing the print data;
a print data sending processor that sends the print data to be stored in the parent machine;
a print completion reception processor that receives print completion information from the child machine that has printed the print data;
a print history manager that updates print-related history of a corresponding printer on the basis of the received print completion information; and
a parent machine setting device that specifies a most frequently used printer on the basis of the updated history when sending new print data, switches the parent machine to a specified printer when the specified printer differs from the current parent machine, and causes the switched parent machine to send the new print data.

2. The print instruction device according to claim 1, wherein
the print history manager counts number of times the print completion information is received for each of the child machines as sending sources, and
the parent machine setting device refers to the number of times the print completion information is received, which is counted for each of the child machines, and specifies the most frequently used printer.

3. The print instruction device according to claim 1, wherein when switching a parent machine setting, the parent machine setting device sends an instruction to each of the printers having the function as the child machine, so as to switch the parent machine setting to the specified printer.

4. The print instruction device according to claim 1, wherein the print completion information includes child machine differentiating information and information on a print function executable by the child machine, the child machine differentiating information being used to differentiate the child machine that has performed printing from another child machine.

5. The print instruction device according to claim 4, wherein the print history manager manages, for each of the child machines, the information on the print function executable by the child machine on the basis of the received print completion information, and in the case where a specific print function is used for printing of the print data, the parent machine setting device narrows down a target to a printer capable of implementing the print function as the child machine, and specifies the most frequently used printer.

6. The print instruction device according to claim 1, wherein the communicator further communicates with another printer that only has the function as the child machine, the printer that has the functions as the parent machine and the child machine sends the print completion information after printing of the print data, the printer that only has the function as the child machine does not send the print completion information after printing of the print data, and the parent machine setting device executes processing to switch the parent machine on the basis of the print-related history of the corresponding printer that is updated on the basis of the received print completion information.

7. A print control method comprising:

sending print data to be stored in a parent machine by a controller of a print instruction device that communicates with plural printers, each of which has a function as the parent machine storing the print data and has a function as a child machine acquiring and printing the print data;

receiving print completion information from the child machine that has printed the print data;

updating print-related history of a corresponding printer on the basis of the received print completion information; and specifying a most frequently used printer on the basis of the updated history when sending new print data, switching the parent machine to a specified printer when the specified printer differs from the current parent machine, and sending the new print data to the switched parent machine.

\* \* \* \* \*